United States Patent
Kaneda

(10) Patent No.: US 10,560,041 B2
(45) Date of Patent: Feb. 11, 2020

(54) ELECTRIC MOTOR SYSTEM AND METHOD FOR RELEASING BRAKE

(71) Applicant: KABUSHIKI KAISHA YASKAWA DENKI, Kitakyushu-shi (JP)

(72) Inventor: Heiji Kaneda, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 34 days.

(21) Appl. No.: 15/466,872

(22) Filed: Mar. 23, 2017

(65) Prior Publication Data
US 2017/0279382 A1    Sep. 28, 2017

(30) Foreign Application Priority Data

Mar. 25, 2016    (JP) .................................. 2016-061893

(51) Int. Cl.
*H02P 3/04*    (2006.01)
*H02P 27/06*   (2006.01)

(52) U.S. Cl.
CPC ................ *H02P 3/04* (2013.01); *H02P 27/06* (2013.01)

(58) Field of Classification Search
CPC ...... H02P 3/12; H02P 3/16; H02P 3/22; H02P 3/26; H02P 3/24; H02P 21/36; H02P 3/04; H02P 3/00; H02P 21/00; H02P 29/04; H02P 29/022; H02K 49/00
See application file for complete search history.

(56) References Cited

U.S. PATENT DOCUMENTS

| 4,707,758 | A  | * | 11/1987 | Matsuda  | ................. | B60T 8/885 340/636.15 |
| 5,129,713 | A  | * | 7/1992  | Matsuda  | ................. | B60T 8/88 303/122.05 |
| 7,291,997 | B2 | * | 11/2007 | Nakamura | ................. | H02P 3/04 318/362 |

(Continued)

FOREIGN PATENT DOCUMENTS

| JP | 2004-336878 | 11/2004 |
| JP | 2005-143257 | 6/2005 |

OTHER PUBLICATIONS

Chinese Office Action for corresponding CN Application No. 201710168911.9, dated Oct. 9, 2018.

(Continued)

*Primary Examiner* — Bickey Dhakal
(74) *Attorney, Agent, or Firm* — Mori & Ward, LLP

(57) ABSTRACT

An electric motor system includes an electric motor, an electric brake, a power line, and a driver. The electric brake is integrated with the electric motor and configured to generate braking force against the drive force. The driver is integrated with the electric motor and the electric brake. The power line connects the electric brake to an electric power source via the driver to supply electric power to the electric brake. The driver includes a first circuit and a conduction bypath. The first circuit connects the electric brake to the power source such that electric power is supplied to the electric brake and disconnects the electric brake from the electric power source. Electric power is to be supplied to the electric brake from the electric power source through the conduction bypath even when the first circuit disconnects the electric brake from the electric power source.

12 Claims, 4 Drawing Sheets

(56) References Cited

U.S. PATENT DOCUMENTS

| | | | |
|---|---|---|---|
| 7,336,052 B2* | 2/2008 | Grbovic | H02M 5/458 |
| | | | 318/400.3 |
| 7,400,106 B2* | 7/2008 | DeCicco | B25B 21/00 |
| | | | 318/293 |
| 8,541,963 B2* | 9/2013 | Rottmerhusen | H02P 25/14 |
| | | | 318/273 |
| 2004/0239196 A1 | 12/2004 | Miura et al. | |
| 2005/0098397 A1 | 5/2005 | Nakamura | |
| 2007/0013332 A1 | 1/2007 | Grbovic | |
| 2016/0329840 A1* | 11/2016 | Mori | H02P 3/22 |

OTHER PUBLICATIONS

Japanese Office Action for corresponding JP Application No. 2016-061893, dated Jan. 8, 2019 (w/ English machine translation).
Chinese Office Action for corresponding CN Application No. 201710168911.9, dated Apr. 3, 2019.

* cited by examiner

ELECTRIC MOTOR SYSTEM AND METHOD FOR RELEASING BRAKE

CROSS-REFERENCE TO RELATED APPLICATIONS

The present application claims priority under 35 U.S.C. § 119 to Japanese Patent Application No. 2016-061893, filed Mar. 25, 2016. The contents of this application are incorporated herein by reference in their entirety.

BACKGROUND

Field of the Invention

The embodiments disclosed herein relate to an electric motor system and a method for releasing a brake.

Discussion of the Background

Japanese Unexamined Patent Application Publication No. 2004-336878 discloses a brake motor that includes, as integral parts, a motor, a brake, and a drive controller.

SUMMARY

According to one aspect of the present disclosure, an electric motor system includes an electric motor, an electric brake, a power line, and a driver. The electric motor generates drive force. The electric brake is integrated with the electric motor and configured to generate braking force against the drive force. The driver is integrated with the electric motor and the electric brake. The power line connects the electric brake to an electric power source via the driver to supply electric power to the electric brake. The driver includes a first circuit and a conduction bypath. The first circuit connects the electric brake to the power source such that electric power is supplied to the electric brake and disconnects the electric brake from the electric power source. Electric power is to be supplied to the electric brake from the electric power source through the conduction bypath even when the first circuit disconnects the electric brake from the electric power source.

According to another aspect of the present disclosure, a method for releasing a brake using an electric motor system including an electric motor, an electric brake integrated with the electric motor and configured to generate braking force against the drive force, a power line, and a driver integrated with the electric motor and the electric brake, the power line connecting the electric brake to an electric power source via the driver to supply electric power to the electric brake, the driver including a first circuit to connect the electric brake to the power source such that electric power is supplied to the electric brake and to disconnect the electric brake from the electric power source, a conduction bypath, the method includes supplying an electric power to the electric brake through the conduction bypath from the electric power source even when the first circuit disconnects the electric brake from the electric power source.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
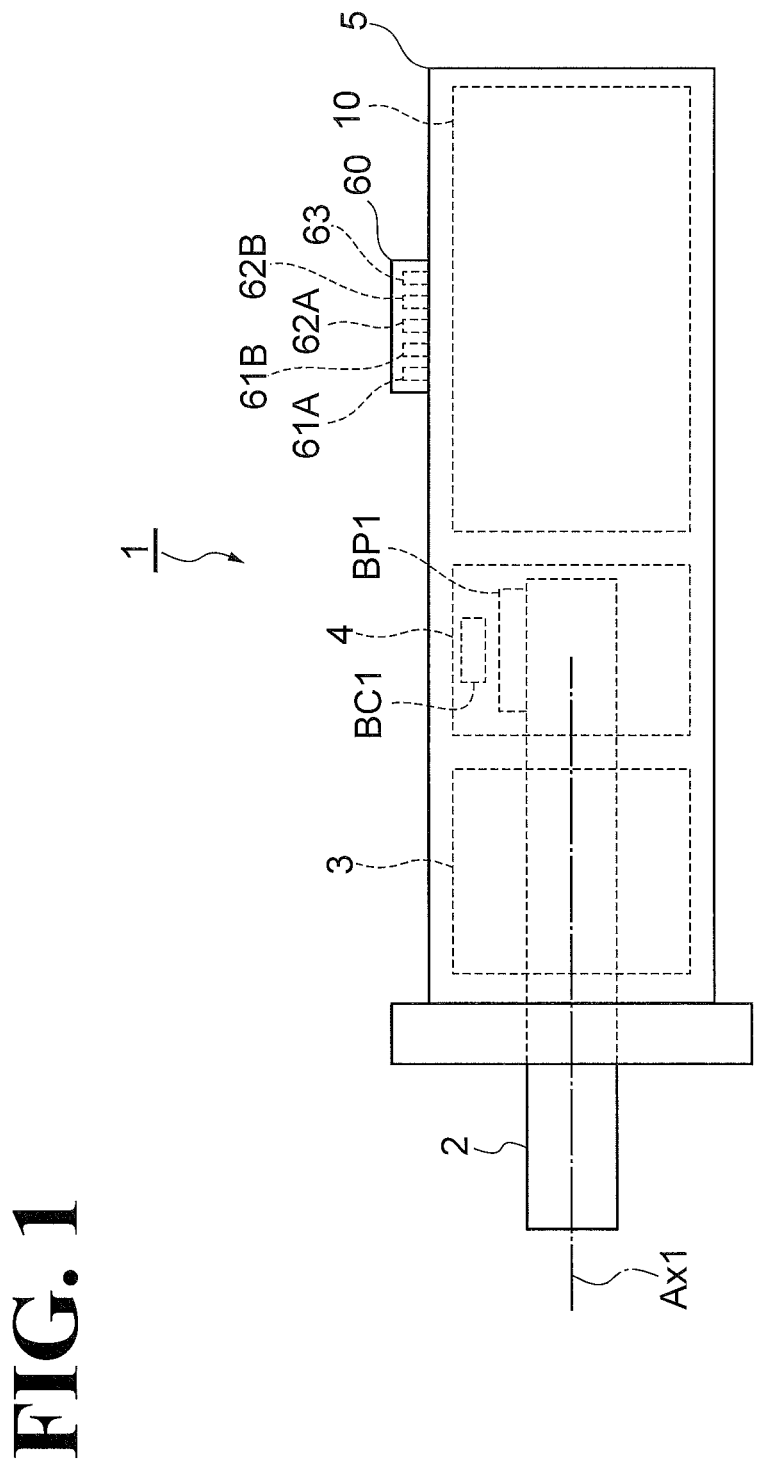
FIG. 1 is a schematic illustrating a configuration of an electric motor.

The embodiments will now be described with reference to the accompanying drawings, wherein like reference numerals designate corresponding or identical elements throughout the various drawings.

An electric motor according to an embodiment includes a motor, a brake, and a driver. The motor generates motive power based on electric power. The brake is integral to the motor and generates braking force against the motor based on the electric power. The driver is integral to the motor and the brake, and includes a power line, a first circuit, and a conduction path. Through the power line, the electric power is guided to the brake. The first circuit switches between a connection state in which the brake is connected to the power line and a disconnection state in which the brake is disconnected from the power line. The conduction path includes a portion of the power line, and the electric power is supplied to the brake through the conduction path in the disconnection state.

The electric motor may be a rotary electric motor, which has a rotatable output shaft, or may be a linear electric motor, which has a movable body. The following description is concerning a configuration of a rotary electric motor.

Mechanical Configuration of the Electric Motor

As illustrated in FIG. 1, an electric motor 1 includes an output shaft 2, a motor 3, a brake 4, and a driver 10. The output shaft 2 is rotatable about the center axis, Ax1, of the output shaft 2. The motor 3 generates rotational torque of the output shaft 2 based on electric power. The motor 3 may be a synchronous motor or an induction motor.

The brake 4 generates braking force against the motor 3 based on electric power. As used herein, the "braking force against the motor 3" refers to a force against the motive power of the motor 3. For example, the brake 4 generates braking torque of the output shaft 2 in a direction opposite to the rotational torque generated by the motor 3. Specifically, the brake 4 includes a braking element BP1, a non-limiting example of which is a brake pad. The braking element BP1 causes frictional resistance to occur as the braking torque.

Based on whether electric power is present or absent, the brake 4 switches between a state in which the braking element BP1 is in direct or indirect contact with the output shaft 2 (this state will be hereinafter referred to as "braking state") and a state in which the braking element BP1 is off the output shaft 2 (this state will be hereinafter referred to as "release state"). The brake 4 may switch from the braking state to the release state in response to supply of electric power, or may switch from the release state to the braking state in response to supply of electric power. In this embodiment, the brake 4 includes a brake coil BC1. In response to supply of electric power, the brake coil BC1 removes the braking element BP1 from the output shaft 2. That is, the brake 4 switches from the braking state to the release state in response to supply of electric power to the brake coil BC1.

The driver 10 controls the motor 3 and the brake 4.

The brake 4 is integral to the motor 3, and the driver 10 is integral to the motor 3 and the brake 4. In other words, the motor 3, the brake 4, and the driver 10 are integral to each other.

As used herein, being "integral to" means that the combined elements are so fixed to each other that they can be treated as an integral entity. In a possible embodiment, the motor 3, the brake 4, and the driver 10 may be fixed to a common rigid body such as a plate, so that the motor 3, the brake 4, and the driver 10 are integral to each other. In another possible embodiment, the motor 3, the brake 4, and the driver 10 may be contained in a case, so that the motor 3, the brake 4, and the driver 10 are integral to each other.

In this embodiment, the electric motor 1 includes an integral case 5. The case 5 contains the motor 3, the brake 4, and the driver 10. The output shaft 2 is held in the case 5 in a rotatable manner about the center axis Ax1 with one end of the output shaft 2 protruding outside the case 5. In the case 5, the motor 3 generates the rotational torque of the output shaft 2; the brake 4 generates the braking torque of the output shaft 2; and the driver 10 is located in a space abutting on the space in which the motor 3 and the brake 4 are located.

As used herein, the "integral case" is intended to have an integral external appearance and may have a plurality of internal spaces defined inside the case. The "integral case" may also be a combination of a plurality of cases.

The electric motor 1 further includes a connector 60. The connector 60 is disposed on the case 5 to receive electric power supplied to the driver 10 and input and output electrical signals. Specifically, the connector 60 includes first terminals 61A and 61B, second terminals 62A and 62B, and a third terminal 63. Through the first terminals 61A and 61B, electric power is supplied to the brake 4. Through the second terminals 62A and 62B, electric power is supplied to the motor 3. Through the third terminal 63, electrical signals are input and output.

Electrical Configuration of the Electric Motor

Figure 2:
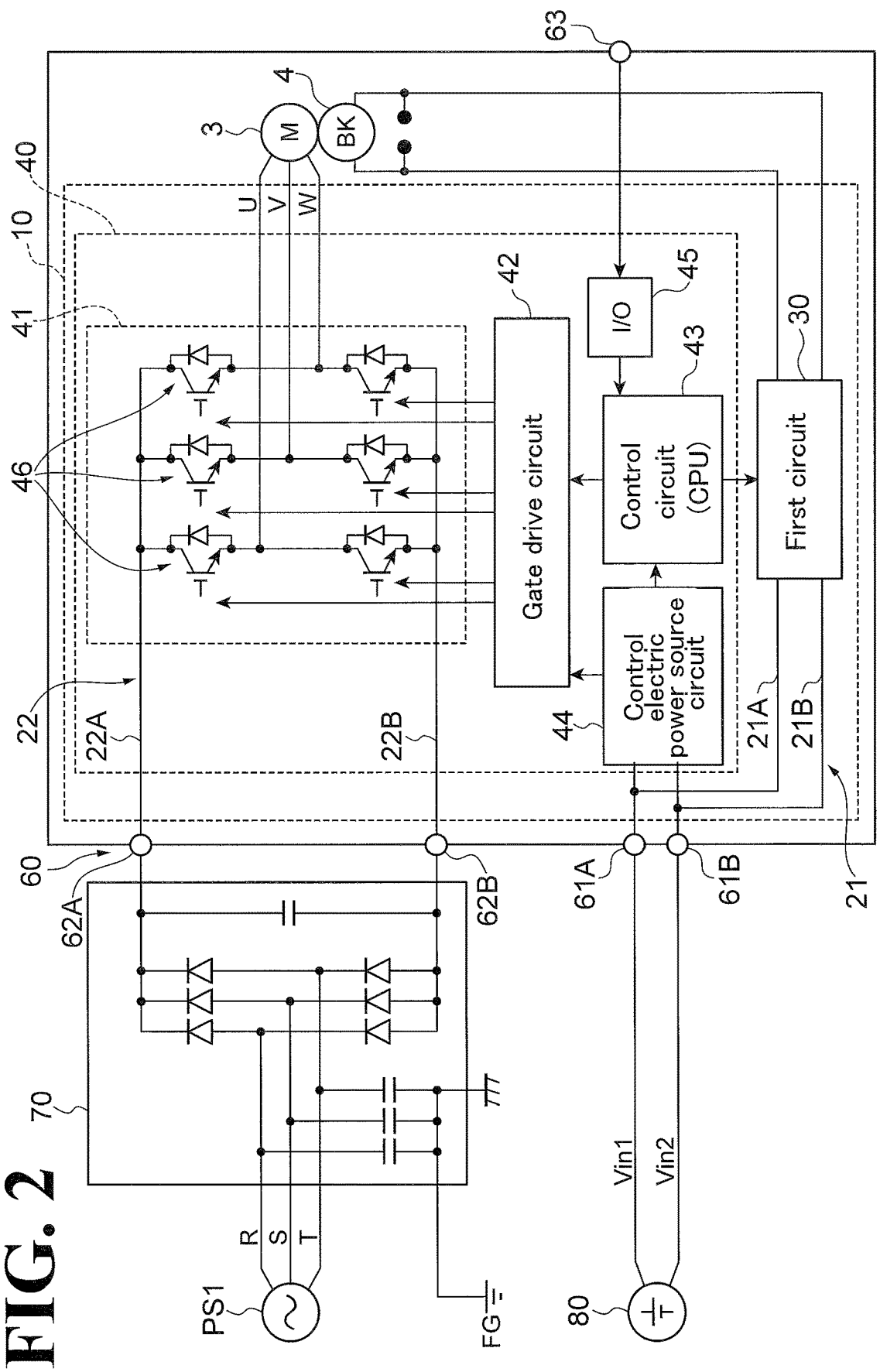
FIG. 2 is a schematic illustrating a configuration of a circuit of the electric motor.
Figure 3:
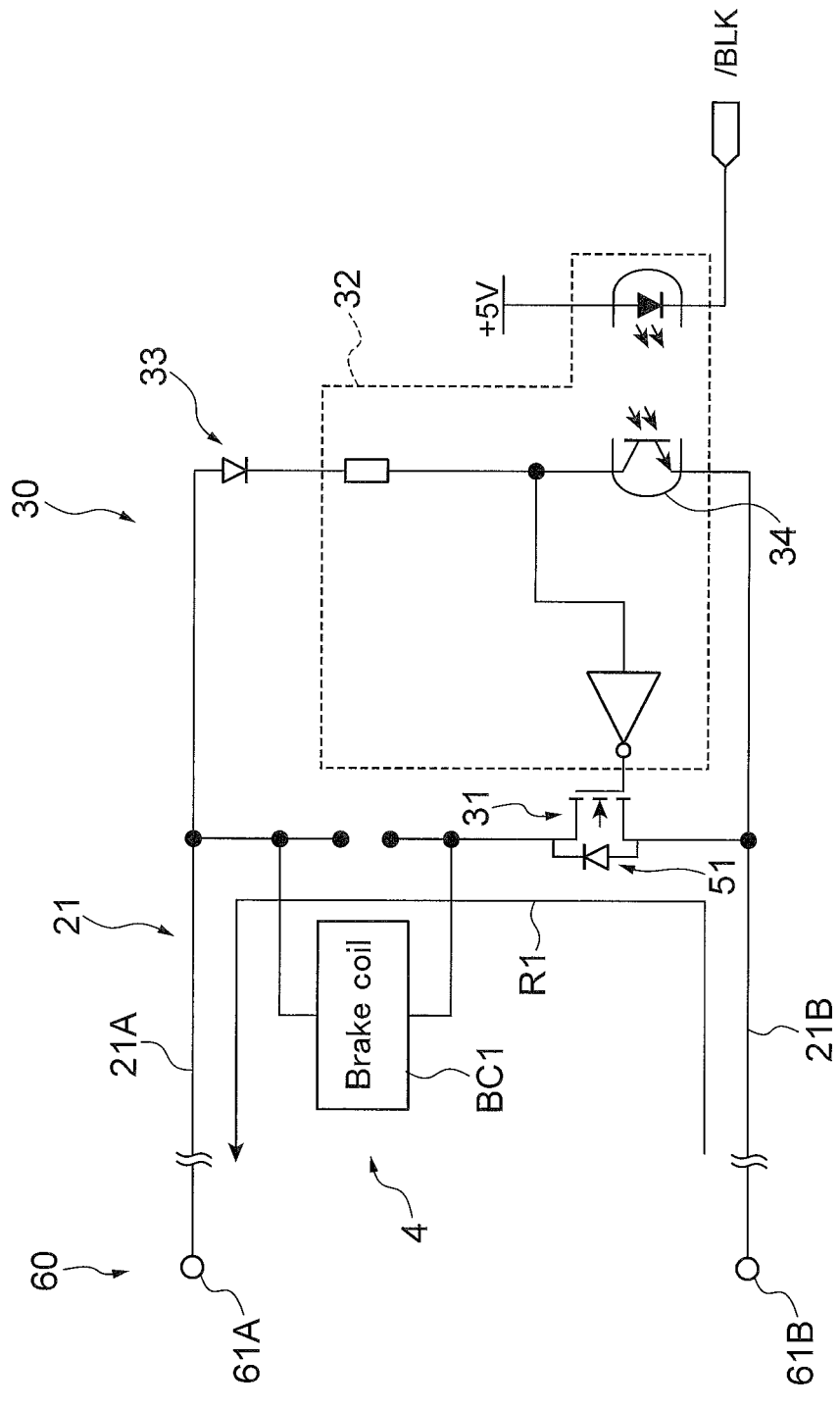
FIG. 3 is a schematic illustrating an exemplary first circuit.

As illustrated in FIGS. 2 and 3, the driver 10 includes a power line 21, a first circuit 30, and a conduction path R1.

Through the power line 21, electric power is guided to the brake 4. The electric power guided to the brake 4 causes the brake coil BC1 of the brake 4 to switch between the braking state and the release state. Specifically, the power line 21 includes a first line 21A and a second line 21B. The first line 21A is brought into connection to the positive electrode of a DC (Direct Current) electric power source 80 when the first circuit 30 is operated. The second line 21B is brought into connection to the negative electrode of the DC electric power source 80 when the first circuit 30 is operated.

The first line 21A and the second line 21B are respectively connected to the first terminals 61A and 61B of the connector 60. When the first circuit 30 is operated, the positive electrode of the DC electric power source 80 is connected to the first terminal 61A, and the negative electrode of the DC electric power source 80 is connected to the first terminal 61B. Thus, the first line 21A is connected to the positive electrode of the DC electric power source 80, and the second line 21B is connected to the negative electrode of the DC electric power source 80.

One end of the brake coil BC1 is electrically connected to the first line 21A, and the other end of the brake coil BC1 is electrically connected to the second line 21B. By this configuration, the power line 21 guides electric power to the brake coil BC1.

The first circuit 30 switches between a connection state in which the brake 4 is connected to the power line 21 and a disconnection state in which the brake 4 is disconnected from the power line 21. As used herein, the "connection state in which the brake 4 is connected to the power line 21" refers to a state in which one end of the brake coil BC1 (which is an element of the brake 4 that switches between the braking state and the release state) is electrically connected to the first line 21A, and the other end of the brake coil BC1 is electrically connected to the second line 21B. As used herein, the "disconnection state in which the brake 4 is disconnected from the power line 21" refers to a state in which at least one end of the brake coil BC1 is not electrically connected to any of the first line 21A and the second line 21B.

Specifically, as illustrated in FIG. 3, the first circuit 30 includes a switch 31. The switch 31 is disposed between the brake 4 and the second line 21B, or may be disposed between the brake 4 and the first line 21A. The switch 31 switches its state between a conduction state and a non-conduction state. In the embodiment of FIG. 3, the switch 31 is disposed between the second line 21B and the other end of the brake coil BC1, with the one end of the brake coil BC1 being connected to the first line 21A without intervention by the switch 31. In another possible embodiment, the switch 31 may be disposed between the first line 21A and the one end of the brake coil BC1, with the other end of the brake coil BC1 being connected to the second line 21B without intervention by the switch 31. A non-limiting example of the switch 31 is a metal-oxide-semiconductor field-effect transistor (MOSFET).

The first circuit 30 further includes a switch drive circuit 32. The switch drive circuit 32 is brought into operation on the electric power supplied from the power line 21 to switch between the conduction state and the non-conduction state of the switch 31.

As illustrated in FIG. 2, the driver 10 further includes a second circuit 40 and a power line 22. The second circuit 40 drives the motor 3 using electric power guided to the second circuit 40 through the power line 22. The power line 22 includes a first line 22A and a second line 22B. The first line 22A is connected to the positive electrode of a DC electric power source 70 when the second circuit 40 is operated. The second line 22B is connected to the negative electrode of the DC electric power source 70 when the second circuit 40 is operated.

The first line 22A is connected to the second terminal 62A of the connector 60, and the second line 22B is connected to the second terminal 62B of the connector 60. When the second circuit 40 is operated, the positive electrode of the DC electric power source 70 is brought into connection to the second terminal 62A, and the negative electrode of the DC electric power source 70 is brought into connection to the second terminal 62B. Thus, the first line 22A is connected to the positive electrode of the DC electric power source 70, and the second line 22B is connected to the negative electrode of the DC electric power source 70. The DC electric power source 70 includes a converter that rectifies AC (Alternating Current) electric power (for example, three-phase AC electric power) supplied from an AC electric power source PS1 to make DC electric power.

As illustrated in FIG. 2, the second circuit 40 includes a bridge circuit 41, a gate drive circuit 42, a control circuit 43, a control electric power source circuit 44, and an input-output circuit 45.

The bridge circuit 41 includes a plurality of switching elements 46. The plurality of switching elements 46 are connected to the first line 22A and the second line 22B. The bridge circuit 41 turns the switching elements 46 on and off to output AC electric power (for example, three-phase AC electric power) used to drive the motor 3. A non-limiting example of each switching element 46 is an insulated gate bipolar transistor (IGBT).

In order to turn the switching elements 46 on and off, the gate drive circuit 42 outputs signals to the switching elements 46.

The control circuit 43 controls the bridge circuit 41 through the gate drive circuit 42 to output AC electric power that is based on a command input. The control circuit 43 outputs to the first circuit 30 a command signal to switch between the connection state, in which the brake 4 is connected to the power line 21, and the disconnection state, in which the brake 4 is disconnected from the power line 21. In response to the command signal from the second circuit 40, the first circuit 30 switches between the connection state, in which the brake 4 is connected to the power line, and the disconnection state, in which the brake 4 is disconnected from the power line 21. For example, the control circuit 43 outputs to the first circuit 30 a command to release the brake, when the control circuit 43 controls the bridge circuit 41 to output AC electric power to the motor 3. Specifically, the control circuit 43 outputs to the switch drive circuit 32 (illustrated in FIG. 3) a signal making a command to turn the switch 31 into the conduction state.

As illustrated in FIG. 3, a photo-coupler 34 is disposed between the control circuit 43 and the first circuit 30. The photo-coupler 34 allows a signal to be transmitted through the photo-coupler 34 while securing electrical insulation between the control circuit 43 and the first circuit 30.

Referring again to FIG. 2, the control electric power source circuit 44 supplies the gate drive circuit 42 and the control circuit 43 with electric power obtained using a control-purpose voltage. A non-limiting example of the control electric power source circuit 44 is a DC/DC converter that converts the voltage supplied to the power line 21 into a control-purpose voltage, obtains electric power using the control-purpose voltage, and supplies the obtained electric power to the gate drive circuit 42 and the control circuit 43.

The input-output circuit 45 inputs and outputs signals between the control circuit 43 and peripheral devices of the electric motor 1 (for example, an upper-level motion controller). More specifically, the input-output circuit 45 is disposed between the control circuit 43 and the third terminal 63 to input and output signals between the control circuit 43 and peripheral devices connected to the third terminal 63.

The conduction path R1, illustrated in FIG. 3, is a path which includes a portion of the power line 21 and through which electric power is supplied to the brake 4 in the disconnection state, in which the brake 4 is disconnected from the power line 21. Specifically, the conduction path R1 includes a first rectification element 51, which is connected in parallel to the switch 31. The first rectification element 51 allows a current to flow from the second line 21B toward the first line 21A, whereas the first rectification element 51 allows no or little current to flow from the first line 21A toward the second line 21B. A non-limiting example of the first rectification element 51 is a diode. When the first rectification element 51 "allows no or little current to flow", this is intended to mean that a negligible amount of current that does not adversely affects the operation of the brake 4 may be allowed to flow.

The first rectification element 51 allows a current to flow from the second line 21B toward the first line 21A irrespective of whether the switch 31 is in the conduction state or the non-conduction state. This causes the conduction path R1 to be formed, allowing electric power to be supplied to the brake 4 by way of the second line 21B, the first rectification element 51, the brake coil BC1, and the first line 21A.

The first circuit 30 further includes a second rectification element 33, in addition to the first rectification element 51, which is included in the conduction path R1. The second rectification element 33 is disposed between the switch drive circuit 32 and the first line 21A, or may be disposed between the switch drive circuit 32 and the second line 21B. The second rectification element 33 allows a current to flow from the first line 21A toward the second line 21B, whereas the second rectification element 33 allows no or little current to flow from the second line 21B toward the first line 21A. A non-limiting example of the second rectification element 33 is a diode. When the second rectification element 33 "allows no or little current to flow", this is intended to mean that a negligible amount of current that does not adversely affects the switch drive circuit 32 may be allowed to flow.

It should be noted that the conduction path R1 is not intended in a limiting sense; any other conduction path is possible insofar as at least a portion of the power line 21 is used to supply electric power to the brake 4 in the disconnection state, in which the brake 4 is disconnected from the power line 21.

Figure 4:
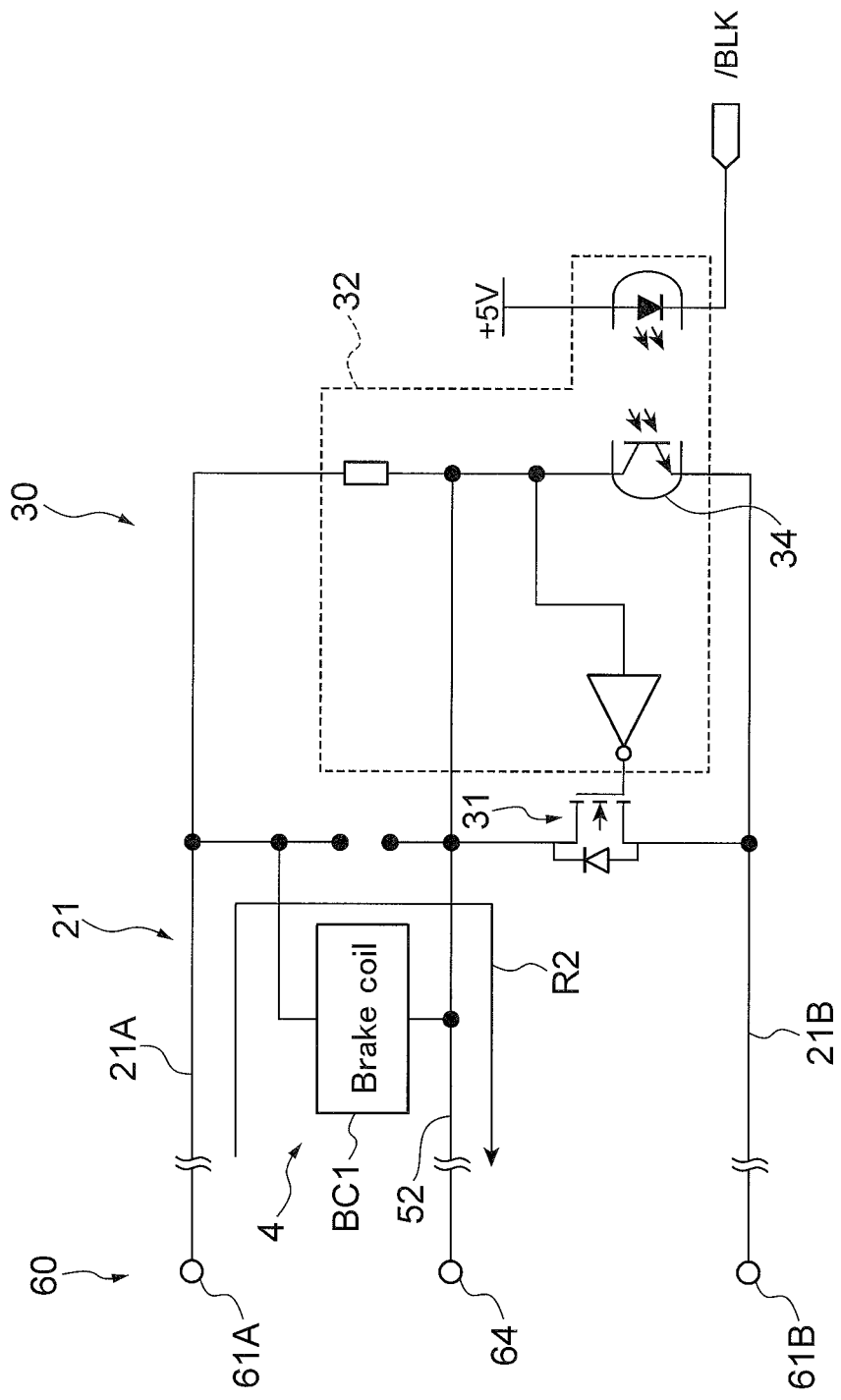
FIG. 4 is a schematic illustrating another exemplary first circuit.

For example, as illustrated in FIG. 4, the driver 10 may include a conduction path R2. The conduction path R2 includes a bypass line 52. The bypass line 52 is disposed between the switch 31 and the brake 4 and connected to the switch 31 and the brake 4. For example, the bypass line 52 is connected to a conduction member disposed between the brake coil BC1 and the switch 31.

The connector 60 further includes a fourth terminal 64, which is used to operate the brake 4. The fourth terminal 64 is connected to one end of the bypass line 52, which extends from between the switch 31 and the brake 4.

The bypass line 52 is electrically connected to the switch 31 side end of the brake coil BC1 irrespective of whether the switch 31 is in the conduction state or the non-conduction state. This causes the conduction path R2 to be formed, allowing electric power to be supplied to the brake 4 by way of the first line 21A, which is connected to the brake coil BC1 without intervention by the switch 31, the brake coil BC1, and the bypass line 52.

In the embodiment of FIG. 4, the first line 21A is connected to the brake coil BC1 without intervention by the switch 31. In this case, the conduction path R2 is made up of the first line 21A, the brake coil BC1, and the bypass line 52. In another possible embodiment, the second line 21B may be connected to the brake coil BC1 without intervention by the switch 31. In this case, the conduction path R2 is made up of the second line 21B, the brake coil BC1, and the bypass line 52. In both cases, a conduction is established in the direction from the brake coil BC1 toward the bypass line 52 and in the direction from the bypass line 52 toward the brake coil BC1.

The conduction path R1 or R2 enables the driver 10 to implement the method for releasing the brake 4 by switching the brake 4 from the braking state to the release state even in the disconnection state, in which the brake 4 is disconnected from the power line 21. Specifically, through the conduction path R1 or R2, a portion of the power line 21 is used to supply electric power to the brake 4.

In the embodiment where the driver 10 includes the conduction path R1, the use of a portion of the power line 21 to supply electric power to the brake 4 can be implemented by: connecting the second line 21B to the positive electrode of the electric power source; and connecting the first line 21A to the negative electrode of the electric power source. In this manner, electric power is supplied to the brake 4, so that the brake 4 is switched from the braking state to the release state.

More specifically, the positive electrode of the DC electric power source 80 is brought into connection to the first terminal 61B, and the negative electrode of the DC electric power source 80 is brought into connection to the first terminal 61A. This causes electric power to be supplied to the brake coil BC1, switching the brake 4 from the braking state to the release state.

In the embodiment where the driver 10 includes the conduction path R2, the use of a portion of the power line 21 to supply electric power to the brake 4 can be implemented by supplying electric power to the brake 4 through the bypass line 52 and either the first line 21A or the second line 21B. In this manner, the brake 4 is switched from the braking state to the release state.

More specifically, the positive electrode of the DC electric power source 80 is brought into connection to either the first terminal 61A or the first terminal 61B, and the negative electrode of the DC electric power source 80 is brought into connection to the fourth terminal 64. This causes electric power to be supplied to the brake coil BC1, switching the brake 4 from the braking state to the release state. Alternatively, the positive electrode of the DC electric power source 80 is brought into connection to the fourth terminal 64, and the negative electrode of the DC electric power source 80 is brought into connection to either the first terminal 61A or the first terminal 61B. This also causes electric power to be supplied to the brake coil BC1, switching the brake 4 from the braking state to the release state.

Advantageous Effects of the Embodiments

As has been described hereinbefore, the electric motor 1 includes the motor 3, the brake 4, and the driver 10. The motor 3 generates motive power based on electric power. The brake 4 is integral to the motor 3 and generates braking force against the motor 3 based on electric power. The driver 10 is integral to the motor 3 and the brake 4. The driver 10 includes the power line 21, the first circuit 30, and the conduction path R1. Through the power line 21, electric power is guided to the brake 4. The first circuit 30 switches between the connection state, in which the brake 4 is connected to the power line 21, and the disconnection state, in which the brake 4 is disconnected from the power line 21. The conduction path R1 includes a portion of the power line 21, and electric power is supplied to the brake 4 through the conduction path R1 in the disconnection state.

The electric motor 1 may further include the case 5, in which the motor 3, the brake 4, and the driver 10 are contained.

In electric motors with a motor and a brake, the brake is switched between braking state and release state based on how the motor is operating. Such electric motor sometimes or often meets with the need to turn the brake into release state regardless of how the motor is operating, such as when the electric motor is fitted into an apparatus and it is necessary to manually adjust the rotational angle of the output shaft of the electric motor. In separate applications in which the electric motor, the motor, and the driver of the brake are separate from each other, the brake can be forced into release state by removing the cable of the electric motor that is connected to the driver and by applying voltage to the brake terminal. In integral applications in which the motor 3, the brake 4, and the driver 10 are integral to each other, as in the electric motor 1, the electric motor 1 also sometimes or often meets with the need to turn the brake 4 into release state.

If there were no other way to release the brake 4 than to switch the state of connection between the power line 21 and the brake 4 using the first circuit 30, it would be necessary to activate the driver 10 while the fitting of the electric motor 1 into the apparatus is still incomplete and to input a command signal into the first circuit 30.

In the electric motor 1, the driver 10 includes the conduction path R1 or R2. Through the conduction path R1 or R2, electric power is supplied to the brake 4. This eliminates the need to activate the driver 10 in switching the brake 4 from the braking state to the release state. Additionally, at least a portion of the power line 21 is used as the conduction path R1, and this configuration eliminates or minimizes increase in the number of components that is otherwise involved in implementing the conduction path R1. Thus, the brake 4 is released by a simplest or least complex structure.

The driver 10 further includes the second circuit 40, which drives the motor 3. In response to a command signal from the second circuit 40, the first circuit 30 switches between the connection state, in which the brake 4 is connected to the power line 21, and the disconnection state, in which the brake 4 is disconnected from the power line 21. In this respect, when the brake 4 is to be released by the driver 10, the operation becomes more complex: send a signal to the second circuit 40 to drive the motor 3, and cause the second circuit 40 to output a signal to the first circuit 30 to release the brake 4. Thus, releasing the brake 4 through the conduction path R1 is more advantageous.

The power line 21 includes the first line 21A and the second line 21B. The first line 21A is connectable to the positive electrode of the electric power source when the first circuit 30 is operated. The second line 21B is connectable to the negative electrode of the electric power source when the first circuit 30 is operated. The first circuit 30 includes the switch 31. The switch 31 is disposed between the brake 4 and the first line 21A or between the brake 4 and the second line 21B, and switches the state of the switch 31 between the conduction state and the non-conduction state. The conduction path R1 includes the first rectification element 51. The first rectification element 51 is connected in parallel to the switch 31 and allows a current to flow from the second line 21B toward the first line 21A. This configuration enables the electric power source to be electrically connected to the brake 4 through the second line 21B, the first rectification element 51, and the first line 21A. The second line 21B is connected to the positive electrode of the electric power source and the first line 21A is connected to the negative electrode of the electric power source. This configuration enables the brake 4 to be released. Additionally, the above configuration eliminates the need for providing an input-output line dedicated to releasing the brake 4 in addition to the first line 21A and the second line 21B, improving reliability in eliminating or minimizing complexation of the structure to release the brake 4.

The first circuit 30 further includes the switch drive circuit 32 and the second rectification element 33. The switch drive circuit 32 is brought into operation on the electric power supplied from the power line 21 to switch between the conduction state and the non-conduction state of the switch 31. The second rectification element 33 is disposed between the switch drive circuit 32 and the first line 21A or between the switch drive circuit 32 and the second line 21B, and allows a current to flow from the first line 21A toward the second line 21B. This configuration ensures that the current toward the switch drive circuit 32 is blocked when the second line 21B is connected to the positive electrode of the electric power source and the first line 21A is connected to the negative electrode of the electric power source. This, as a result, improves reliability in supplying electric power to the brake 4.

The power line 21 includes the first line 21A and the second line 21B. The first line 21A is connectable to the positive electrode of the electric power source when the first circuit 30 is operated. The second line 21B is connectable to the negative electrode of the electric power source when the first circuit 30 is operated. The first circuit 30 includes the switch 31. The switch 31 is disposed between the brake 4 and the first line 21A or between the brake 4 and the second line 21B, and makes and breaks a conduction between the first line 21A and the second line 21B. The conduction path R2 includes the bypass line 52. The bypass line 52 is disposed between the switch 31 and the brake 4 and connected to the switch 31 and the brake 4. This configuration enables the electric power source to be electrically connected to the brake 4 through the bypass line 52 and either the first line 21A or the second line 21B that is connected to the brake 4 without intervention by the switch 31. Thus, one of the two lines to establish a conduction to the brake 4 is implemented by the power line 21. This configuration eliminates or minimizes complexation of the structure to release the brake 4.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. An electric motor system comprising:
   an electric motor to generate drive force;
   an electric brake integrated with the electric motor and configured to generate braking force against the drive force;
   a power line; and
   a driver integrated with the electric motor and the electric brake, the power line connecting the electric brake to an electric power source via the driver to supply electric power to the electric brake, the driver comprising:
      a first circuit to connect the electric brake to the electric power source such that electric power is supplied to the electric brake from the electric power source and to disconnect the electric brake from the electric power source, the first circuit being configured to allow current to flow from a first terminal of the electric brake through the electric brake to a second terminal of the electric brake when the first circuit connects the electric brake to the electric power source; and
      a conduction bypath through which electric power is to be supplied to the electric brake from the electric power source such that current flows from the second terminal through the electric brake to the first terminal even when the first circuit disconnects the electric brake from the electric power source,
   wherein the power line comprises:
      a first line connectable to a positive electrode of the electric power source to operate the first circuit; and
      a second line connectable to a negative electrode of the electric power source to operate the first circuit,
   wherein the first circuit comprises a switch disposed between the electric brake and the first line or between the electric brake and the second line and configured to switch a state of the switch between a conduction state and a non-conduction state, and
   wherein the conduction bypath comprises a first rectification element connected in parallel to the switch and configured to allow a current to flow from the second line toward the first line.

2. The electric motor according to claim 1, further comprising a case in which the electric motor, the electric brake, and the driver are contained.

3. The electric motor system according to claim 2, wherein the conduction bypath comprises a bypass line disposed between the switch and the electric brake and connected to the switch and the electric brake.

4. The electric motor system according to claim 1, wherein the driver further comprises a second circuit configured to drive the electric motor, and
   wherein the first circuit is configured to switch between a connection state and a disconnection state based on a command signal from the second circuit.

5. The electric motor system according to claim 1, wherein the first circuit further comprises
   a switch drive circuit operable by the electric power supplied through the power line to switch between the conduction state and the non-conduction state of the switch, and
   a second rectification element disposed between the switch drive circuit and the first line or the second line and configured to allow a current to flow from the first line toward the second line.

6. The electric motor system according to claim 1, wherein the conduction bypath comprises a bypass line disposed between the switch and the electric brake and connected to the switch and the electric brake.

7. The electric motor system according to claim 2, wherein the driver further comprises a second circuit configured to drive the electric motor, and
   wherein the first circuit is configured to switch between a connection state and a disconnection state based on a command signal from the second circuit.

8. The electric motor system according to claim 7, wherein the conduction bypath comprises a bypass line disposed between the switch and the electric brake and connected to the switch and the electric brake.

9. The electric motor system according to claim 1, wherein the conduction bypath comprises a bypass line disposed between the switch and the electric brake and connected to the switch and the electric brake.

10. The electric motor system according to claim 1, wherein the conduction bypath includes a portion of the power line.

11. The electric motor system according to claim 1, wherein electric power is supplied to the brake through the conduction bypath in a disconnection state where the power line is electrically disconnected to at least one end of a brake coil of the electric brake.

12. A method for releasing a brake using an electric motor system including an electric motor, an electric brake integrated with the electric motor and configured to generate braking force against the drive force, a power line, and a driver integrated with the electric motor and the electric brake, the power line connecting the electric brake to an electric power source via the driver to supply electric power to the electric brake, the driver including a conduction bypath comprising a first circuit to connect the electric brake to the electric power source such that electric power is supplied to the electric brake and to disconnect the electric brake from the electric power source, the first circuit allows current to flow from a first terminal of the electric brake through the electric brake to a second terminal of the electric brake when the first circuit connects the electric brake to the electric power source, the method comprising:

supplying an electric power to the electric brake through the conduction bypath from the electric power source such that current flows from the second terminal through the electric brake to the first terminal even when the first circuit disconnects the electric brake from the electric power source, wherein the power line comprises
a first line connectable to a positive electrode of the electric power source to operate the first circuit, and
a second line connectable to a negative electrode of the electric power source to operate the first circuit, and wherein the supplying step comprises connecting the second line to the positive electrode of the electric power source and connecting the first line to the negative electrode of the electric power source, so as to supply the electric power to the electric brake such that current flows from the second terminal through the electric brake to the first terminal.

* * * * *